United States Patent [19]
Howes

[11] 3,805,636
[45] Apr. 23, 1974

[54] ENERGY ABSORBING STEERING COLUMN FOR MOTOR VEHICLES
[75] Inventor: Benjamin T. Howes, Birmingham, Mich.
[73] Assignee: Ford Motor Company, Dearborn, Mich.
[22] Filed: Dec. 4, 1972
[21] Appl. No.: 311,983

[52] U.S. Cl. .................................................. 74/492
[51] Int. Cl. .............................................. B62d 1/18
[58] Field of Search .............................. 74/492, 493

[56]  References Cited
UNITED STATES PATENTS
| 3,373,629 | 3/1968 | Wight et al. | 74/492 |
| 3,470,761 | 10/1969 | Okamoto et al. | 74/492 |
| 3,505,897 | 4/1970 | Scheffler et al. | 74/492 |
| 3,540,304 | 11/1970 | Weiss | 74/492 |
| 3,590,655 | 7/1971 | Farrell | 74/492 |

Primary Examiner—Allan D. Herrmann
Attorney, Agent, or Firm—Keith L. Zerschling; Clifford L. Sadler

[57] ABSTRACT

An energy absorbing steering column for a motor vehicle includes a padded steering wheel, an energy absorbing steering column portion, a vehicle body mounted breakaway support bracket and abutment means on the steering column spaced from reaction means on vehicle body structure. When a forwardly directed major impact load is imposed upon the steering wheel, the forces directed to the various components of the steering column will cause a series of consecutive functions to be performed or events to occur as follows: (1) the energy absorbing padding on the steering wheel will deflect, (2) the breakaway support connecting the steering column to the vehicle body will separate, (3) the inertia of the steering column will be overcome and the column will be displaced forwardly, (4) the abutment means of the column and the reaction means of the body will come into engagement and (5) the energy absorbing portion of the steering column will deform to thereby absorb a major portion of the impact load.

12 Claims, 3 Drawing Figures

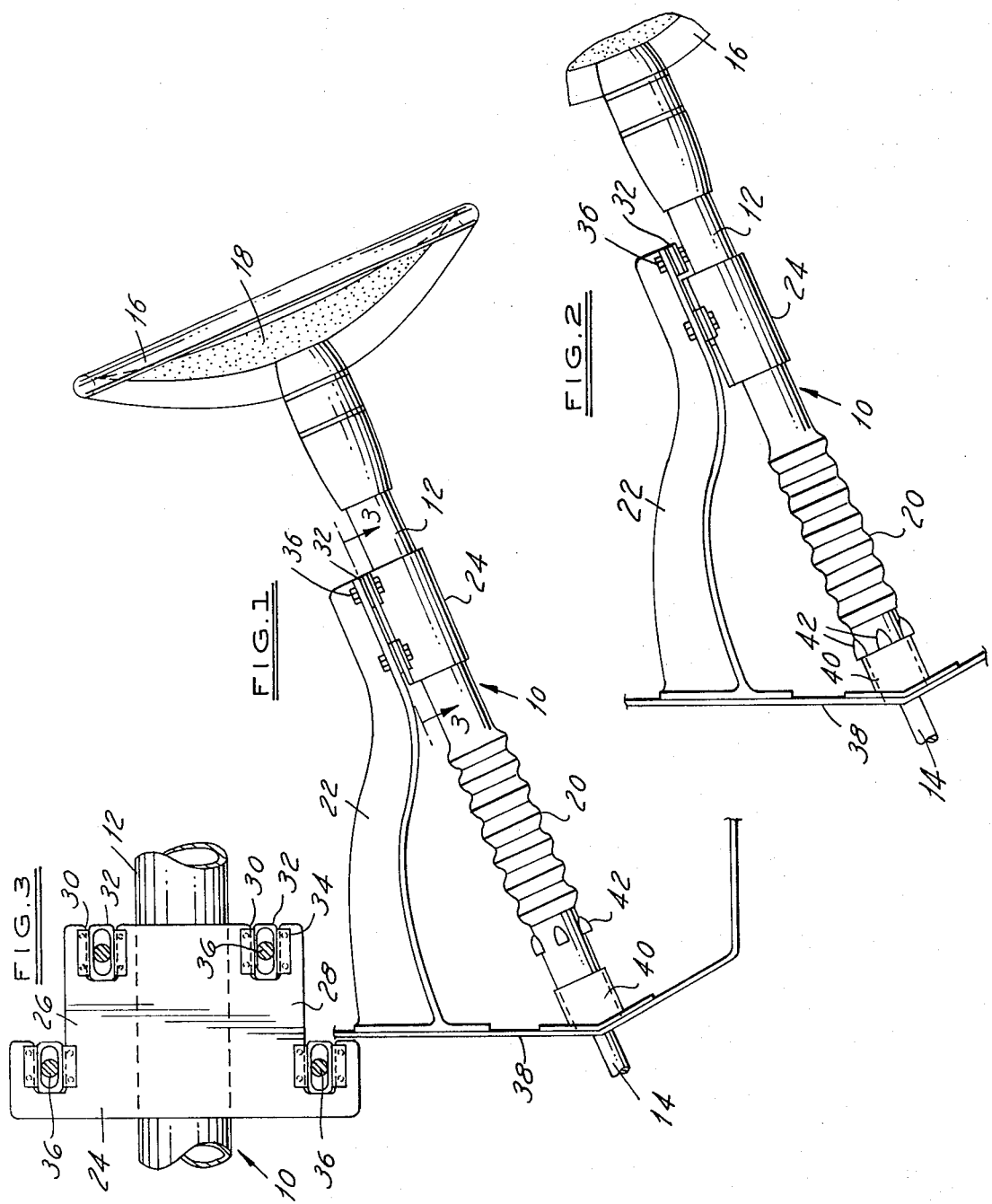

ENERGY ABSORBING STEERING COLUMN FOR MOTOR VEHICLES

BACKGROUND OF THE INVENTION

The present disclosure relates to energy absorbing steering columns and more particularly to a steering column assembly for a motor vehicle that is constructed to absorb impact loads directed against the steering wheel. As is conventional in steering column designs, it is the function of the column to dissipate the kinetic energy of an impact load directed against the steering wheel by displacement of the wheel and corresponding deformation of plastically deformable energy absorbing portions of the column assembly. It is a desideratum that the column dissipate the energy at a uniform rate.

SUMMARY OF THE PRESENT DISCLOSURE

In accordance with the present invention, a steering column assembly is provided for a motor vehicle that includes a steering wheel with a padded rearward face. A breakaway support bracket connects the steering column to a structural member of the vehicle body. The column includes a portion that is plastically deformable under major load. A support bracket mounted on the vehicle body slidably supports a portion of the steering column. Abutment means connected to the column is spaced apart from reaction means connected to body support structure.

When a forwardly directed impact load is imposed upon the steering wheel, the steering wheel pad will deflect. If the magnitude of the impact is less than a predetermined minimum, the load will be supported by the breakaway steering column bracket. If the load exceeds the predetermined minimum amount, then the breakaway bracket will separate from the body structure to permit forward displacement of the steering column. The steering column will be displaced forwardly until its abutment means engages the reaction means mounted on the body. After the abutment means contacts the reaction means, the energy absorbing portion of the steering column will then become loaded and will collapse in a controlled manner to dissipate the kinetic energy of the impacting object.

Due to the fact that the abutment means of the steering column is spaced apart from the reaction means of the body, a lag is provided between the separation of the breakaway support bracket, the forward displacement of the steering column and the deformation of the energy absorbing portion of the column. Therefore, the forces required to fracture the breakaway bracket, to overcome the inertia of the steering column, to move the column forwardly and to collapse the energy absorbing section of the column will not be imposed one upon the other to produce a high peak load. Instead, separation of the bracket, overcoming the inertia of the steering column and collapse of the energy absorbing section will occur in a serial fashion producing an even load without high peak forces.

BRIEF DESCRIPTION OF THE DRAWINGS

The many advantages of a vehicle steering column construction in accordance with this invention will become apparent upon consideration of the following description and the accompanying drawings, in which:

FIG. 1 is a side elevational view of a steering column assembly for a motor vehicle embodying the presently preferred form of this invention;

FIG. 2 is a side elevational view showing the column displaced forwardly under the force of an impact load; and FIG. 3 is a view taken along section line 3—3 of FIG. 1 disclosing the breakaway support bracket.

DETAILED DESCRIPTION OF THE PREFERRED EMBODIMENT

Referring now to the drawings, wherein the presently preferred embodiment of this invention is illustrated, FIG. 1 shows an energy absorbing steering column assembly 10 for a motor vehicle. The steering column 10 has an outer tubular jacket 12 that rotatably supports a steering shaft 14. The forward end of the shaft 14 is constructed to be connected to a steering gear (not shown).

A steering wheel 16 is connected to the rearward end of the steering shaft 14 and a thick energy absorbing pad 18 is secured to the rearward face of the wheel 16. The pad 18 is formed of resilient material such as foam rubber.

The tubular jacket 12 of the steering column 10 has a convoluted or corrugated section 20 that is constructed to collapse under an impact load. The plastic deformation of the convoluted energy absorbing portion 20 will dissipate the kinetic energy of the impact.

The steering column assembly 10 is supported from a structural member 22 of the vehicle body by means of a breakaway bracket 24. The breakaway bracket 24 is affixed to the column tube 12 and has laterally extending flange portions 26 and 28. Each flange portion 26 and 28 is provided with a pair of rearwardly opening slots 30. A die cast shear pin retainer 32 is situated in each slot and supports a series of frangible plastic shear pins 34 that extend through drilled holes in the flanges 26 and 28 adjacent to the slots 30.

As seen in FIG. 3, a total of four slots 30 are provided in the flanges 26 and 28 with a shear pin retainer 32 positioned in each slot. Bolts 36 extend through the shear pin retainers 32 to secure the breakaway bracket 24 to the structural member 22.

Means are provided to support the lower end of the steering column 10. The vehicle body structure includes a toeboard 38 upon which a tubular reaction member 40 is secured. The reaction member 40 has a central opening that slidably receives the lower end of the tubular jacket 12. A series of circumferentially spaced abutment members 42 is provided on the exterior surface of the tube 12. The abutment members 42 are spaced from the reaction member 40 for the purposes which will be described.

OPERATION

In the event a minor forwardly directed impact load is imposed upon the steering wheel 16, the pad 18 will deflect to absorb and dissipate the kinetic energy of the impact.

In the event a major impact load is imposed upon the steering wheel 16, a series of consecutive events will occur. During the initial phase of the impact, the resilient pad 18 will deflect to absorb a small portion of the load. As the pad 18 deflects, an increasing load will be transmitted through the column 12 to its components, including the break-away bracket 24. When the magnitude of the load builds up to a point where it exceeds a predetermined minimum value, the shear pins 34 supported by the several shear pin retainers 32 will fracture. The bracket 42 will then be free to slip forwardly with the edges of the rearwardly open slots 30 sliding free of the shear pin retainers 32. A portion of the impact load will be used in overcoming the inertia of the mass of the steering column 10 and accelerating it forwardly so that its speed coincides with the speed of the object which struck the wheel 16. After the column 10 has been accelerated to a speed common with the velocity of the impacting object, abutments 42 of the column 10 will engage the reaction member 40. Upon engagement of the abutments 42 and reaction member 40, the remaining portion of the impact load will cause the convoluted column section 20 to collapse. The plastic deformation of the column section 20 will dissipate the kinetic energy of the impact.

FIG. 2 illustrates the relative position of the various steering column components after the breakaway bracket 24 has fractured, the column has been accelerated forwardly and the abutments 42 have engaged the reaction member 40. This is a view of the several components just prior to the plastic deformation of the convoluted column section 20.

With this construction, the resistance provided by deflection of the energy absorbing pad 18, fracture of the shearable element 34, acceleration of the mass of the steering column 10 and collapse of the convoluted column portion 20 will occur consecutively. Consequently, the steering column of FIG. 1 will provide a uniform resistance to dissipate the kinetic energy of the impact. Unlike some prior art structures, the force required to accelerate the steering column to the speed of the impacting object and the force required to fracture the frangible means of the breakaway bracket will not be superimposed upon the resistance force presented by the collapsible energy absorbing column section. As a consequence, objectionable high peak loads will be avoided.

In a preferred embodiment of the invention, the spacing between the reaction means of the body is at least one inch, a dimension approximately equal to the thickness of the pad on the steering wheel. This spacing permits acceleration of the column assembly up to a speed coinciding with the speed of the impacting object, with the acceleration occurring after the breakaway support bracket separates from the body and before the energy absorbing section of the column outer tube is plastically deformed.

The reaction collar 40 slidably supports the lower end of the steering column tube 12. It provides a comparatively low level of resistance to column displacement. It is desirable to provide sufficient resistance to sliding movement of the column tube 12 to prevent the column 10 from springing forwardly once the bracket 24 is broken away from the body structural member 22. With unrestricted displacement, the energy stored in the collapsed pad 18 may be sufficient to spring the column 10 forwardly moving it away from the impacting object. In one embodiment, a nominal resistance of 200 pounds to displacement of the column through a structure equivalent to the reaction member 40 was appropriate.

The foregoing description presents the presently preferred embodiment of this invention. Alterations and modifications may occur to those skilled in the art which will come within the spirit and scope of the following claims.

I claim:

1. An energy absorbing steering column for a motor vehicle including:
    a vehicle body;
    said steering column being supported in said vehicle body;
    said steering column rotatably supporting a steering shaft;
    a steering wheel secured to the rearward end of said steering shaft;
    releasable connecting means normally securing said steering column to said vehicle body and constructed to disengage said steering column from said vehicle body when subjected to a force above a predetermined minimum value;
    reaction means secured to said vehicle body;
    said steering column having abutment means juxtaposed and spaced apart from said reaction means;
    said steering column having plastically deformable energy absorbing means disposed rearwardly of said abutment means;
    said abutment means being spaced from said reaction means by at least a predetermined minimum amount so that said plastically deformable energy absorbing means functions to absorb a forwardly directed impact load upon said steering wheel only after said impact load causes said releasable connecting means to disengage said steering column from said vehicle body, said steering column to be displaced forwardly, and said reaction means and said abutment means to come into engagement.

2. An energy absorbing steering column for a motor vehicle including:
    a vehicle body having first and second support members;
    said steering column being disposed in said vehicle body and supported by said support members;
    said steering column supporting a rotatable steering shaft;
    a steering wheel secured to the rearward end of said steering shaft;
    energy absorbing padding means mounted on the rearward face of said steering wheel;
    releasable connecting means normally connecting said steering column to said first support member and constructed to disconnect said steering column from said first support member when subjected to a force above a predetermined minimum value;
    said second support member slidably engaging said steering column;
    reaction means secured to said vehicle body;
    said steering column having abutment means juxtaposed and spaced apart from said reaction means;
    said steering column having plastically deformable energy absorbing means disposed rearwardly of said abutment means;
    said energy absorbing means being constructed so that a greater force is required to plastically deform it than is required to slidably displace said steering column with respect to said second support member;

said abutment means being spaced from said reaction means by at least a predetermined minimum amount so that said plastically deformable energy absorbing means functions to absorb a forwardly directed impact load upon said steering wheel only after said impact load causes said releasable connecting means to disconnect said steering column from said first support member, said steering column to be displaced forwardly, and said reaction means and said abutment means to come into engagement.

3. An energy absorbing steering column for a motor vehicle according to claim 2 and including:
said abutment means being spaced apart from said reaction means by at least one inch.

4. An energy absorbing steering column for a motor vehicle according to claim 2 and including:
said steering column having a tubular outer casing, said plastically deformable energy absorbing means comprising a convoluted portion of said casing.

5. An energy absorbing steering column for a motor vehicle according to claim 2 and including:
said abutment means being spaced apart from said reaction means by an amount approximately equal to the thickness of said energy absorbing padding means.

6. An energy absorbing steering column for a motor vehicle according to claim 5 and including:
said abutment means being spaced apart from said reaction means by at least one inch.

7. An energy absorbing steering column for a motor vehicle including:
a vehicle body having first and second support members;
said steering column being disposed in said vehicle body and supported by said support members;
said steering column supporting a rotatable steering shaft;
a steering wheel secured to the rearward end of said steering shaft;
said steering wheel including energy absorbing padding means mounted on the rearward face thereof;
breakaway connecting means normally securing said steering column to said first support member and constructed to disengage said steering column from said first support member when subjected to a force above a predetermined minimum value;
means slidably supporting said steering column at said second support member;
a pair of normally spaced apart abutment means;
one of said abutment means being connected to said body and the other of said abutment means being connected to said steering column;
said steering column having plastically deformable energy absorbing means;
said energy absorbing means being constructed so that a greater force is required to plastically deform it than is required to slidably displace said steering column with respect to said second support member;
said one abutment means being spaced apart from said other abutment means by at least a predetermined minimum amount so that said energy absorbing means absorbs a forwardly directed impact load upon said steering wheel only after said impact load causes said breakaway connecting means to disengage said steering column from said first support member, said steering column to be displaced forwardly, and said reaction means and said abutment means to come into engagement.

8. An energy absorbing steering column for a motor vehicle including:
a vehicle body having first and second support members;
said steering column being disposed in said vehicle body and supported by said support members;
said steering column rotatably supporting a steering shaft;
a steering wheel secured to the rearward end of said steering shaft;
said steering wheel including energy absorbing padding means mounted on the rearward face thereof;

breakaway connecting means normally securing said steering column to said first support member and constructed to disengage said steering column from said first support member when subjected to a force above a predetermined minimum value;
means slidably supporting said steering column at said second support member;
a pair of normally spaced apart abutment means;
one of said abutment means being connected to said body and the other of said abutment means being connected to said steering column;
said steering column having an outer tube with a convoluted plastically deformable energy absorbing portion;
said convoluted energy absorbing portion being situated between said steering wheel and said abutment means;
said energy absorbing means being constructed so that a greater force is required to plastically deform it than is required to slidably displace said steering column with respect to said second support member;
said one abutment means being spaced apart from said other abutment means by at least a predetermined minimum amount whereby said energy absorbing portion is plastically deformed to absorb the kinetic energy of an object impacting upon said steering wheel only after the force of said impact load causes said breakaway connecting means to disengage said steering column from said first support member, said steering column to be accelerated forwardly to a speed coinciding with the speed of said impacting object, and said one abutment means and said other abutment means to come into engagement.

9. An energy absorbing steering column for a motor vehicle according to claim 8 and including:
said other abutment means comprising an annular collar secured to said vehicle body and encircling said outer tube;
said one abutment means comprising a plurality of detents constructed to engage the rearward end of said collar.

10. An energy absorbing steering column for a motor vehicle according to claim 8 and including:
said one abutment means being spaced apart from said other abutment means by at least 1 inch.

11. An energy absorbing steering column for a motor vehicle according to claim 8 and including:

said one abutment means being spaced apart from said other abutment means by an amount approximately equal to the thickness of said energy absorbing padding means.

12. An energy absorbing steering column for a motor vehicle according to claim 11 and including:

said one abutment means being spaced apart from said other abutment means by at least 1 inch.

* * * * *